United States Patent
Makabe

(10) Patent No.: US 8,196,699 B2
(45) Date of Patent: Jun. 12, 2012

(54) POWER STEERING DEVICE FOR A SADDLE-RIDDEN VEHICLE

(75) Inventor: Takumi Makabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 329 days.

(21) Appl. No.: 12/693,175

(22) Filed: Jan. 25, 2010

(65) Prior Publication Data

US 2010/0206657 A1    Aug. 19, 2010

(30) Foreign Application Priority Data

Feb. 13, 2009  (JP) ................................. 2009-031845

(51) Int. Cl.
*B62D 5/04* (2006.01)

(52) U.S. Cl. ...................................................... 180/446

(58) Field of Classification Search .................. 180/443, 180/446
See application file for complete search history.

(56) References Cited

U.S. PATENT DOCUMENTS

| 7,073,622 | B2 * | 7/2006 | Turner et al. | 180/446 |
| 7,374,012 | B2 * | 5/2008 | Inui et al. | 180/444 |

FOREIGN PATENT DOCUMENTS

| JP | 60-98572 U | 7/1985 |
| JP | 2007-98984 A | 4/2007 |

* cited by examiner

*Primary Examiner* — Kevin Hurley
(74) *Attorney, Agent, or Firm* — Birch, Stewart, Kolasch & Birch, LLP

(57) ABSTRACT

To suppress temperature rises of an electric power steering device provided at a vehicle equipped with a diff lock device and to restrict the operation of the electric power steering device at times other than during diff locking. An electric power steering device that is coupled to a steering shaft fitted with handlebars at an upper end and that generates auxiliary force that supplements the steering force, and a diff lock unit that selects a differential state and a non-differential state (diff lock) of a differential device are provided. An ECU reduces the maximum value of the auxiliary force generated by the electric power steering device to a prescribed limit value when the diff lock is detected by the diff lock sensor is also provided. The ECU releases limiting of the maximum value of the auxiliary force when release of the diff lock is detected by the diff lock sensor.

20 Claims, 7 Drawing Sheets

POWER STEERING DEVICE FOR A SADDLE-RIDDEN VEHICLE

CROSS-REFERENCE TO RELATED APPLICATIONS

The present application claims priority under 35 USC 119 to Japanese Patent Application No. 2009-031845 filed on Feb. 13, 2009 the entire contents of which are hereby incorporated by reference.

BACKGROUND OF THE INVENTION

1. Field of the Invention

The present invention relates to a power steering device for a saddle-ridden vehicle. More particularly, to a power steering device for a saddle-ridden vehicle having a differential device.

2. Description of Background Art

Four wheel drive vehicles are know that include a differential locking device (hereinafter referred to as a "diff lock device") that puts a differential function of a differential device for causing left and right wheels to be driven in unison into a non-operable state (locked state). The diff lock device is then caused to operate as a result of a rider operating an actuator (referred to as a "diff lock actuator" in the following) of the diff lock device in order to maintain a favorable state of travel on snow-covered roads and irregular surfaces etc.

It is well-known that with vehicles equipped with the above diff lock device the force required for the operation of the steering device, i.e. the steering force becomes large as a result of the diff lock device being actuated. As a result, a power steering device such as in, for example, Utility Model Application Number Sho. 58-188742 (Utility Model Laid Open Number Sho. 60-98572) is proposed where the steering force is substantially fixed as a result of changing the assist force of a hydraulic power steering device in correlation with the operation of the diff lock device. In recent years, electric power steering devices (hereinafter referred to as "EPS") where assist force of a power steering device is obtained using an electric motor are well-known. See, for example, Japanese Patent Publication Laid-open No. 2007-98984.

Current supplied by the electric power steering device to the motor in order to generate a substantial assist force is large in order to maintain the same steering force at the time of diff locking as at times other than the time of diff locking. When diff locking where the current supplied to the motor is large is continued, the temperature of the electric power steering device becomes high. When the temperature of the electric power steering device becomes a prescribed value or more, it can be considered to stop the operation of the power steering device until the temperature falls. However, there are also cases where the temperature of the electric power steering device does not fall below a prescribed value even after the diff lock is released from the necessary travelling state. In such cases, there is a problem that the assist function for the steering force due to the electric power steering device cannot be restored until the temperature of the electric power steering device falls to a prescribed value or less. This causes the handle operation to be continually heavy.

SUMMARY AND OBJECTS OF THE INVENTION

It is therefore an object of an embodiment of the present invention to provide a power steering device for a saddle-ridden vehicle wherein a state when the function of the electric power steering device is stopped for a long time even after the release of the diff lock so as to enable an assist force suited to the drive state of the vehicle to be generated.

In order to achieve the above object according to an embodiment of the present invention, a power steering device is provided for a saddle-ridden vehicle equipped with a steering shaft with handlebars fitted at an upper end, an electric power steering device coupled to the steering shaft that generates auxiliary force that supplements steering force, a differential device, and a diff lock unit that selects a differential state and a non-differential state of the differential device. The power steering device includes a diff lock sensor that senses when a non-differential state of the differential device is selected by the diff lock unit, and a control unit that reduces a maximum value of the auxiliary force generated by the electric power steering device to a prescribed limit value when a non-differential state of the differential device is detected by the diff lock sensor.

According to an embodiment of the present invention, the control unit reduces the maximum value for the auxiliary force when the non-differential state of the differential device continues for a prescribed duration.

According to an embodiment of the present invention, the control unit releases to limit the maximum value for the auxiliary force when it is detected from the detection output of the diff lock sensor as the differential device has switched over from a non-differential state to a differential state.

According to an embodiment of the present invention, the auxiliary force gradually makes the transition to the limit value when limiting the auxiliary force, and the auxiliary force gradually makes the transition to the maximum value when releasing limiting of the auxiliary force.

Further, according to an embodiment of the present invention, the speed of the auxiliary force making the transition from the maximum value to the limit value is set to be faster than the speed of the auxiliary force making the transition from the limit value to the maximum value.

According to an embodiment of the present invention, a maximum value for the auxiliary force (amount of assistance) due to the electric power steering device is limited to being a small value when a non-differential (diff locking) state is detected for a differential device. It is therefore possible to restrict a maximum value for the amount of assist so as to suppress rises in the temperature of the electric power steering device even when load is increased to more than during normal travelling so that a substantial amount of assist force is required. It is therefore possible to, for example, to suppress when operation of an electric power steering device is inhibited at times other than during diff locking for equipment where operation of an electric power steering device is inhibited when the temperature of the electric power steering device is a prescribed value or more.

According to an embodiment of the present invention, it is possible to limit the amount of assist after the differential device has completely entered a non-differential state. It is therefore possible to provide a substantial assist amount to the steering shaft when the diff lock is incomplete and it is therefore possible to carry out smooth steering.

According to an embodiment of the present invention, the assist amount due to the electric power steering is returned to a maximum value when the diff lock is released. For example, a light steering operation is possible when travel takes place with the differential device in a differential state such as when going from travelling off road to travelling on a flat road.

According to an embodiment of the present invention, the assist amount is reduced or increased gradually. It is therefore possible to suppress abrupt changes in steering force.

According to an embodiment of the present invention, it is possible to suppress abrupt changes in steering force during an operation of reducing the amount of assist, and it is possible to rapidly reduce the amount of assist and prevent the temperature of the electric power steering device from rising.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
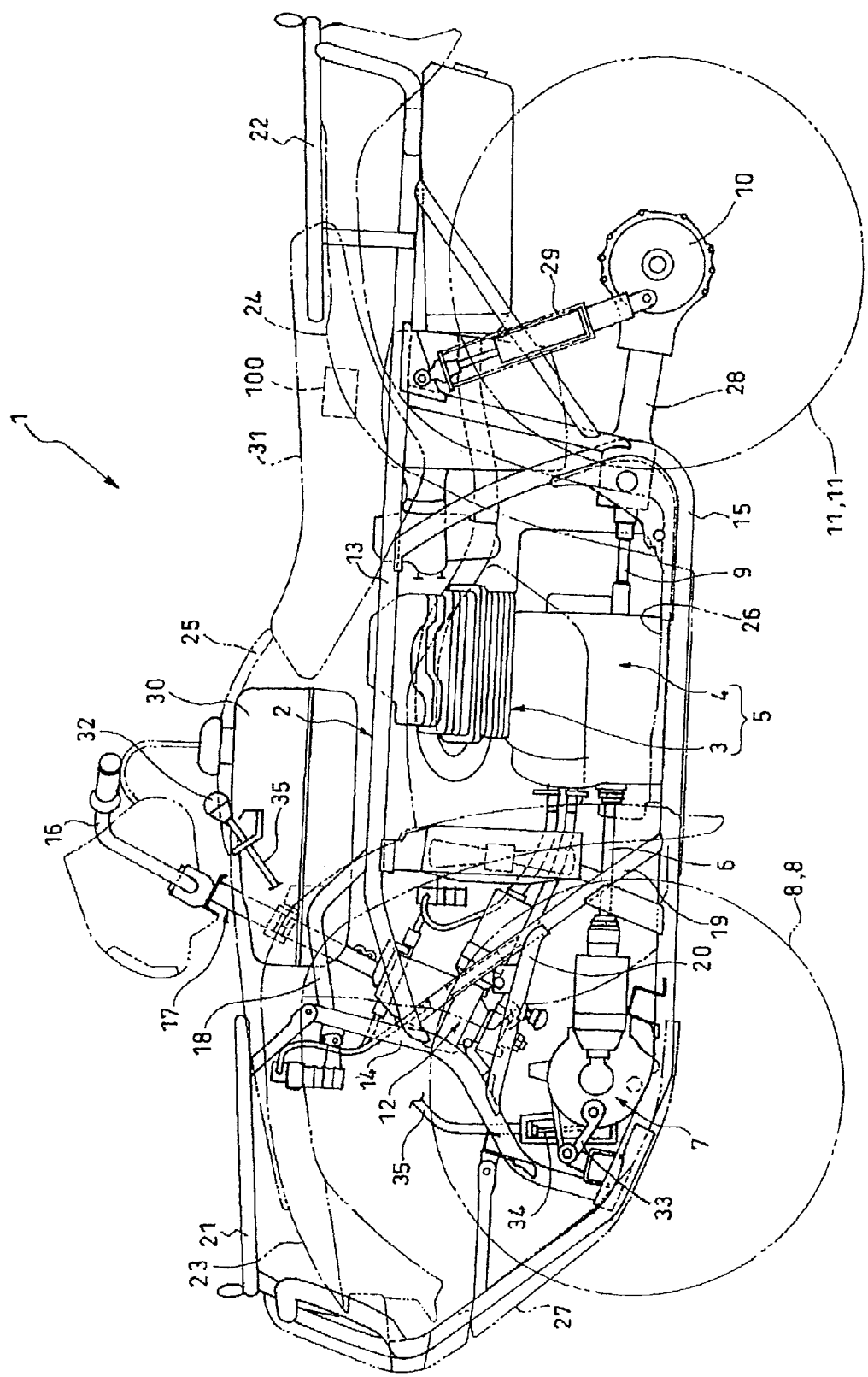
FIG. 2 is a left side view of an off-road vehicle taken as a saddle-ridden vehicle mounted with the electric power steering device of the embodiment of the present invention.

The following is a description with reference to the drawings of an embodiment of the present invention. FIG. 2 is a side view of a saddle-ridden vehicle mounted with a power steering device of the first embodiment of the present invention. Although not specifically stated, in the following description, the orientation of front and rear, and left and right, etc. is taken to be the same as the orientation of the vehicle. In FIG. 2, an off-road vehicle 1 that is a saddle-ridden four-wheeled vehicle has a power unit 5 of an engine 3 and a transmission 4 mounted at a central section of a vehicle body frame 2. A front final reduction device 7 is coupled to a front section of the transmission 4 via a front propeller shaft 6 and left and right front wheels 8, 8 are coupled to the front final reduction device 7 via a drive shaft (not shown). A rear final reduction device 10 is coupled to a rear section of the transmission 4 via a rear propeller shaft 9. Left and right rear wheels 11, 11 are then coupled to this rear final reduction device 10 via a drive shaft (not shown). An electric type power steering device 12 for generating assist force for reducing steering force steering the front wheels 8, 8 is provided at a front section of the vehicle body frame 2.

The vehicle body frame 2 includes a left and right pair of upper main frames 13 extending from front to rear (only the left side upper main frame is shown), a front frame 14 respectively coupled to the front parts of the upper main frames 13, and a pair of the left and right lower main frames 15 (only the left lower main frame 15 is shown) coupled respectively to a lower end of the front frame 14 and a central section of the upper main frame 13. In order to support an upper section of a steering shaft 17 with handlebars 16 fitted at an upper end in a freely rotatable manner, the vehicle body frame 2 includes a pair of left and right front upper arms 18 (only the left side is shown) respectively coupled to an upper end of the front frame 14 and to the pair of upper main frames 13, and a pair of left and right inclined frames 19 (only the right side item is shown) coupled respectively to the lower main frames 15 so as to go downwards to the rear from the front ends of the upper main frames 13. The vehicle body frame 2 is equipped with a pair of the left and right sub-inclined frames 20 (only the left side is shown) respectively coupled to central sections of the pair of left and right inclined frames 19 and the front frame 14. A lower section of the electric power steering device 12 can then be supported by the sub-inclined frames 20.

The off-road vehicle 1 is also equipped with a front carrier 21 at a front part of the vehicle body and a rear carrier 22 at a rear part. The vehicle body is covered by a front fender 23 provided so as to go above and to the rear of the front wheel 8, a rear fender 24 provided so as to go above and to the front of the rear wheels 11 provided so as to go to the side of the power unit 5 from a front section of the vehicle body, a step floor 26 arranged at a lower section of the vehicle body, and a skid plate 27 for the front of the vehicle body.

A swing arm 28 supported so as to reciprocate freely in the vertical direction is provided at the lower main frame 15. The rear wheels 11 are then supported at the vehicle body frame 2 by this swing arm 28 and a pair of left and right rear shock absorbers 29. A fuel tank 30 is provided across a region spanning to the left and right and to the rear of the steering shaft 17. A rider's seat 31 is provided to the rear of the fuel tank 30. An ECU 100 for electrically controlling each part of the off-road vehicle 1 is provided below the rider's seat 31. An ECU (ECU (EPSECU) for use with an electric power steering device) for controlling the power steering device 12 is included in the ECU 100.

A differential device for absorbing differences in the speeds of rotation of the left and right front wheels 8, 8 and a diff lock mechanism for differentially locking this differential device are housed in the front final reduction device 7. A diff lock operation lever 32 is provided at the right side of the upper part of the vehicle body. The diff lock operation lever 32 is connected to the diff lock switching arm 33 using a diff lock switching cable 34. The diff lock switching cable 34 is covered by a cable case 35. By putting the diff lock operation lever 32 into the on position, this movement is transmitted to the switching arm 33 via the cable 34, the diff lock mechanism goes on, and the differential device can be switched to diff locking. On the other hand, by putting the diff lock operation lever 32 into the off position, this movement is transmitted to the switching arm 33 via the cable 34, the diff lock mechanism goes off, and the differential device can be switched to differential possible.

It is also possible for the diff lock device to be provided with, for example, a mechanism where a dog clutch is provided at a gear case that houses the differential gear so that a sleeve that is spline-fitted so as to be freely slidable at an output shaft of the differential gear is then displaced by the switching and 33 so as to engage with the dog clutch. It is also possible for the diff lock device to drive using a hydraulic circuit as disclosed in Utility Model Application Number Sho. 58-188742 (Utility Model Laid Open Number Sho. 60-98572). In this case, the diff lock operation lever 32 is constructed so as to provide an operational instruction to the hydraulic circuit using an electrical signal as the result of the operation of the switch rather than as a result of mechanically causing a switching arm to be moved.

Figure 3:
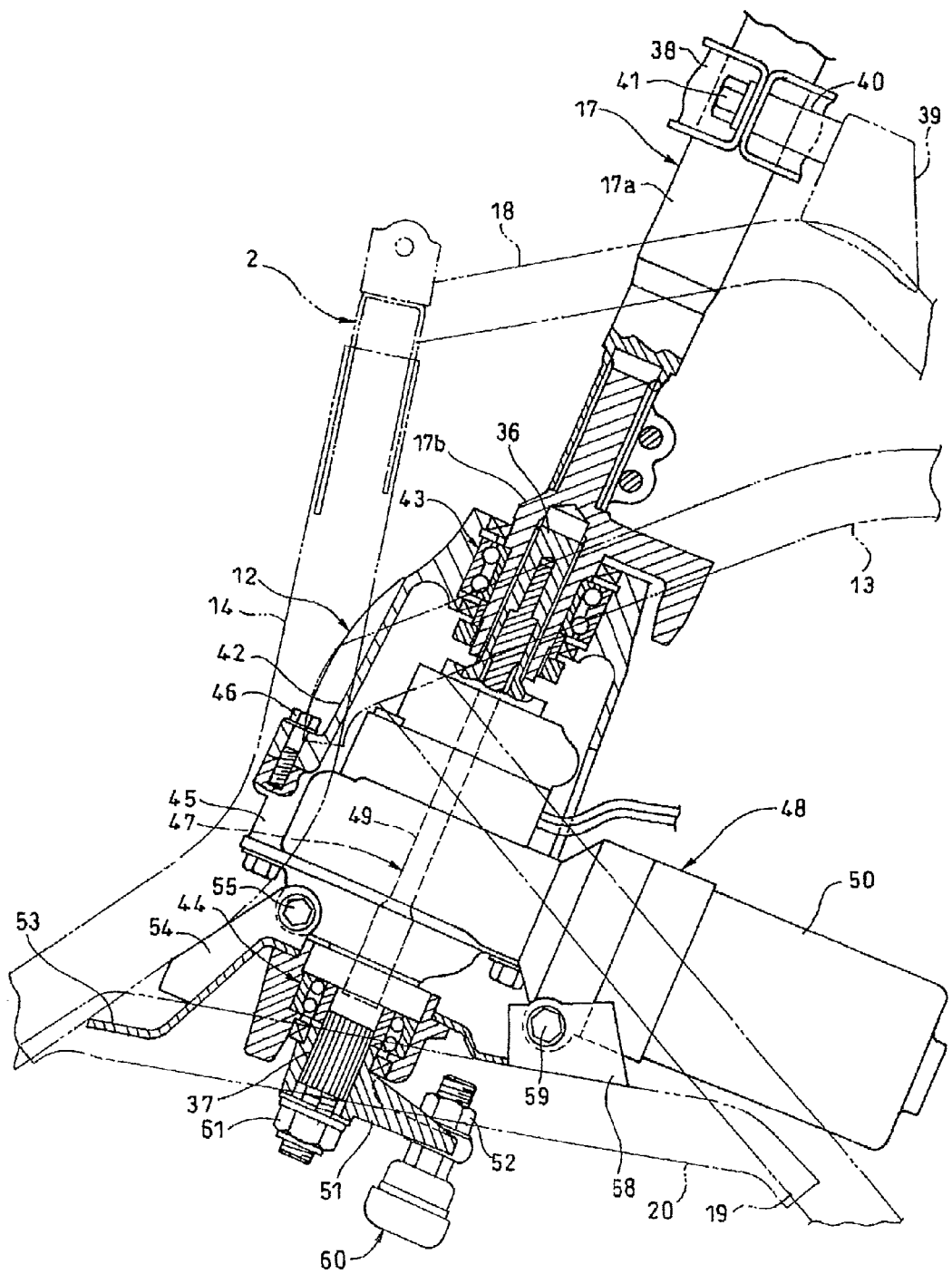
FIG. 3 is an enlarged view of the essential parts of the off-road vehicle.

FIG. 3 is a side view showing the essential parts of a vehicle of the present invention. In FIG. 3, a steering shaft 17 includes an upper shaft 17a fitted with handlebars 16 (refer to FIG. 1) at an upper end, and a lower shaft 17b with an upper end serration-engaging with a lower end of the upper shaft of 17a and a lower end serration-engaging with an EPS input shaft 36.

A lower part of the power steering device 12 is fitted to a lower part of the vehicle body frame 2. An EPS output shaft 37 provided at the lower part of the power steering device 12 is then supported to be freely rotatable at a lower part of the vehicle body frame 2.

The steering shaft 17 is supported with respect to the vehicle body frame 2 as a result of engaging in a freely rotating manner with the upper shaft 17a at a bearing 38 provided at the vehicle body frame 2. The bearing 38 is fixed using a bolt 41 to a boss 40 erected on a cross member 39 that connects the front upper frames 18, 18.

An upper bearing 43 that supports the EPS input shaft 36 serration fitted with the lower shaft 17b in a freely rotating manner and a lower bearing 44 that supports the EPS output shaft 37 in a freely rotating manner are provided at a housing 42 that covers the upper part of the power steering device 12. The housing 42 is fitted to a gear case 45 of the power steering device 12 using a plurality of bolts 46.

A portion of the gear case 45 that is further to the front than the EPS output shaft 37 is fitted using a bolt 55 via a support member 54 to a bracket 53 fitted so as to span sub-inclined frames 20, 20. A portion of the gear case 45 that is further to the rear than the EPS output shaft 37 is fitted using a bolt 59 to a rear section support member 58 provided at the sub-inclined frames 20, 20.

The power steering device 12 includes the EPS input shaft 36 and the EPS output shaft 37, a torque sensor 47 that detects steering torque, and a power assist unit 48 that generates power to supplement the steering force. The power assist unit 48 is controlled by the control device (ECU 100) based on steering torque etc. detected by the torque sensor 47. The EPS input shaft 36 and the EPS output shaft 37 are coupled by a torsion bar 49 constituting the torque sensor 47.

The power assist unit 48 is configured from an electric motor 50 and reduction gears (not shown) including a clutch (not shown), a worm gear, and a worm wheel provided between the output shaft of the electric motor 50 and the EPS output shaft 37.

According to this power steering device 12, when the steering shaft 17 is rotated as a result of the operation of the handlebars 16 (refer to FIG. 1), a relative rotational angle is generated between the EPS input shaft 36 and the EPS output shaft 37 and the torsion bar 49 is twisted. Steering torque can then be obtained by converting the extent of this twisting to torque.

Figure 1:
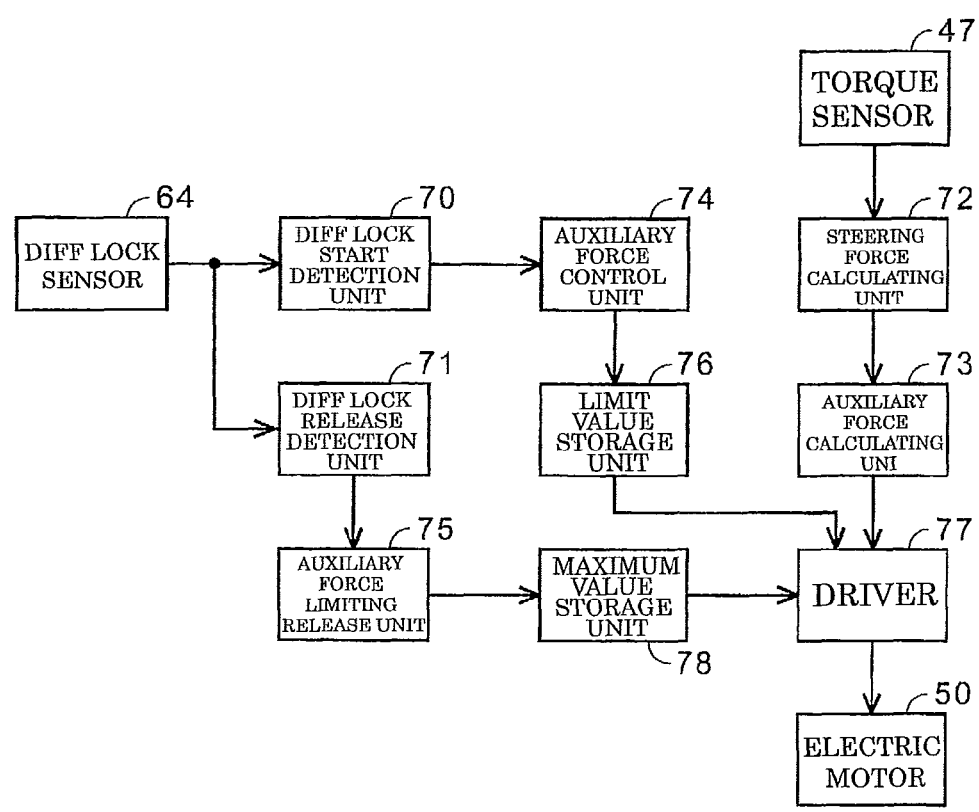
FIG. 1 is a block diagram showing functions of an electric power steering device of an embodiment of the present invention.

The ECU 100 controls the power assist unit 48 based on the steering torque detected by the torque sensor 47, the steering angle detected by a steering sensor (not shown), and the speed etc. of the off-road vehicle 1 (refer to FIG. 1). A battery (not shown) that is the operating power supply for the ECU 100 and the operating power supply for the power steering device 12 is mounted on the vehicle 1. The mounting position for the battery is preferably below the rider's seat 31 next to the ECU 100.

A center arm 51 is coupled to the EPS output shaft 37 and a ball joint 60 is fitted using a nut 52 to the rear part of the center arm 51. The center arm 51 is then fixed to the EPS output shaft 37 by screwing a nut 61 onto threading provided at the tip of the EPS output shaft 37.

Figure 4:
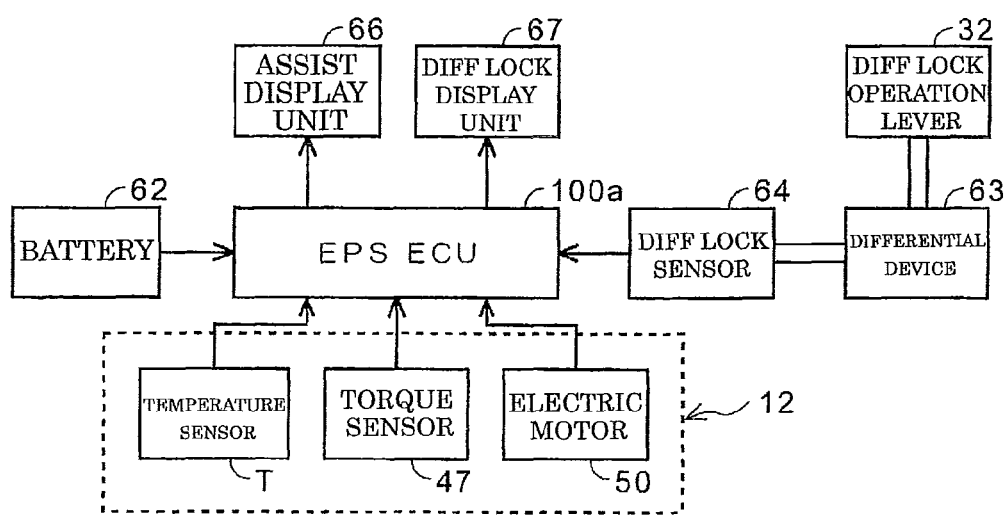
FIG. 4 is a block diagram showing a system configuration for an electric power steering device.

FIG. 4 is a block diagram showing a system configuration for the electric power steering device. In FIG. 4, a battery 62 is connected to an EPSECU 100a as an operating power supply. A differential device 63 can be switched over between a non-differential state (on, i.e. diff locked) or a differential state (off) as a result of the rider operating the diff lock operation lever 32. A diff lock sensor 64 that detects whether or not this differential device 63 is on or off can be fitted to the differential device 63. The diff lock sensor 64 can be constituted by, for example, a position sensor actuated by the diff lock operation lever 32 that detects the position of the sleeve of the diff lock device.

The diff lock sensor 64 is connected to the EPSECU 100a and a detection signal of the diff lock sensor 64 is inputted to the EPSECU 100a. The torque sensor 47 and the electric motor 50 are connected to the EPSECU 100a. The extent of twisting of the torsion bar 49 detected by the torque sensor 47 is inputted to the EPSECU 100a. On the other hand, a drive current from the battery 62 is supplied from the EPSECU 100a to the electric motor 50. An assist display unit 66 and a diff lock display unit 67 are connected to the EPSECU 100a. The assist display unit 66 displays the magnitude of the auxiliary force and a state where the supply (assist) of the auxiliary force is stopped based on the drive current supplied from the battery 62 to the electric motor 50 by the lighting or flashing of display lights. The diff lock display unit 67 also displays an on or off state of the differential device 63 determined by the EPSECU 100a based on a detection signal of the diff lock sensor 64. It is therefore possible to display that the extent of assistance is limited during diff locking using the display equipment so that making the user aware of this is straightforward.

It is also possible to adopt a configuration where, for example, a temperature sensor T is fitted at the gear case 45 with an output signal then being inputted to the EPSECU 100a when the temperature of the power steering device 12 exceeds a prescribed value so as to inhibit the assist operation. According to this embodiment, rises in temperature of the power steering device 12 are suppressed during diff locking. It is therefore possible to suppress inhibiting of the assist operation by the power steering device 12 after releasing of the diff locking, i.e. with the differential device in a differential state.

FIG. 1 is a block diagram of the essential functions of the EPSECU 100. In FIG. 1, a diff lock start detection unit 70 detects when the detection output of the diff lock sensor 64 is switched over from off to on. A diff lock release detection unit 71 detects when the detection output of the diff lock sensor 64 is switched over from on to off.

A steering force calculating unit 72 calculates steering force based on the extent of twisting of the torsion bar 49 detected by the torque sensor 47. An auxiliary force calculating unit 73 calculates the auxiliary force necessary for making the steering force small. This is to say that the auxiliary force is made large when the detection output of the torque sensor 47 is large, and the auxiliary force is made small when the detection output of the torque sensor 47 is small.

An auxiliary force limiting unit 74 is actuated when the diff lock sensor 64 goes on (when the differential device has switched over to a non-differential state) so as to limit the maximum value of the auxiliary force. It is preferable for the auxiliary force limiting unit 74 to start to limit the maximum value of the auxiliary force when the diff lock sensor 64 continues to be on for a prescribed period of time (for example, one second). This is order to ensure that it is possible to start limiting of the auxiliary force from when it is reliably detected that differential locking has been fully completed.

An auxiliary force limiting release unit 75 is actuated when the diff lock sensor 64 is switched over to off (when the differential device is switched over to the differential state) so as to restore the limited maximum value for the auxiliary force to its original value. It is also preferable to determine that the diff lock sensor 64 has been switched to off in the same way as for the time of switching to on when the diff lock sensor 64 continues to be off for a prescribed time (for example, one second). In this way, the auxiliary force value stored in a limit value storage unit 76 is inputted to a driver 77 of the electric motor 50 when the diff lock sensor 64 is on, and the value for the auxiliary force stored in a maximum value storage unit 78 is inputted to the driver 77 when the diff lock sensor 64 is off.

The driver 77 supplies current to the electric motor 50 so as to obtain the auxiliary force calculated by the auxiliary force calculating unit 73. This maximum current is restricted to the current corresponding to the auxiliary force stored in the limit value storage unit 76 or the maximum value storage unit 78.

It is preferable for the auxiliary force limiting unit 74 to reduce the auxiliary force value either in stages or gradually to the limit value when limiting of the auxiliary force is started. It is also preferable for the auxiliary force limiting release unit 75 to perform an increase so as to return the auxiliary force value to the maximum value either in stages or gradually when limiting of the year auxiliary force is released. It is also preferable to set the speed of changing of the auxiliary force to be greater when reducing the auxiliary force than when increasing the auxiliary force. The rider is therefore prevented from feeling discomfort as a result of abrupt changes to the steering force by gradually changing the speed of the transition of the auxiliary force from the maximum value to the limit value or from the limit value to the maximum value. This means that even from within these, and in particular, when diff locking is detected, it is possible to rapidly reduce a maximum value for the auxiliary force to a limit value.

Figure 5:
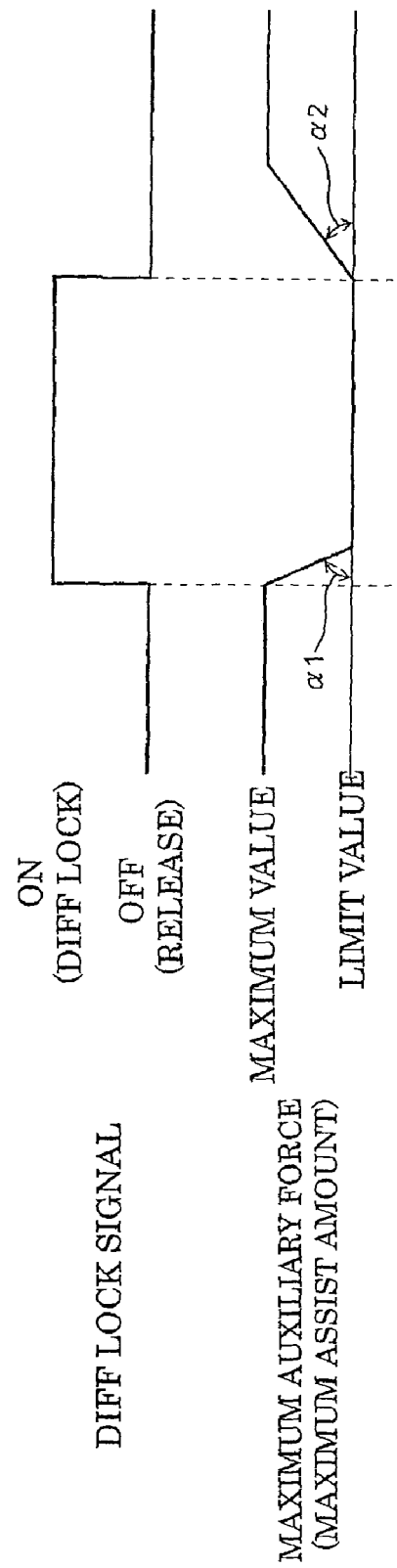
FIG. 5 is a timing chart showing a relationship between a state of a differential device and a maximum auxiliary force value of the electric power steering device.

FIG. 5 is a timing chart showing a relationship between a state of a differential device and a maximum auxiliary force value of the electric power steering device. In FIG. 5, when the detection output (diff lock signal) of the diff lock sensor 64 goes on (or continues to be on for a prescribed time), the maximum auxiliary force is gradually reduced from the maximum value to the limit value. When the diff lock signal goes off (or continues to be off for a prescribed time), the maximum auxiliary force is gradually increased from the limit value to the maximum value. As can be understood from FIG. 5, the change in speed (gradient α1) when the maximum auxiliary force makes the transition from the maximum value to the limit value is greater than the change in speed (gradient α2) when the maximum auxiliary force makes the transition from the limit value to the maximum value.

Figure 6:
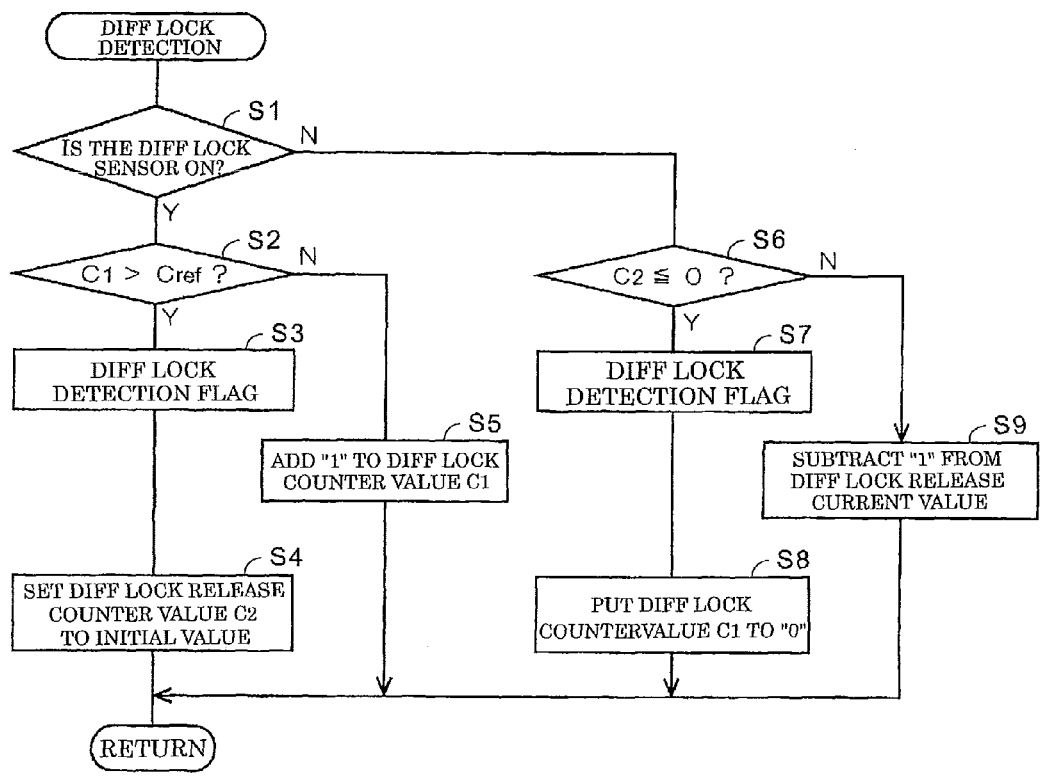
FIG. 6 is a flowchart of EPSSECU diff lock detection processing.

FIG. 6 is a flowchart of diff lock detection processing occurring at the EPSSECU 100a. In step S1 of FIG. 6, it is determined whether the detection output of the diff lock sensor 64 is on or off. When it is determined in step S1 that the diff lock sensor 64 is on, step S2 is proceeded to determine whether or not a diff lock counter C1 that calculates on duration time of the detection output of the diff lock sensor 64 exceeds a threshold value Cref (corresponding to 1 second). If the confirmation in step S2 is affirmative, step S3 is proceeded to and a diff lock detection flag is set to "1". In step S4, an initialization value for the counter value is set to a diff lock release counter C2 that calculates off duration time of the diff lock sensor 64. If the confirmation of step S2 is not affirmative, step S5 is proceeded to and "1" is added to the diff lock counter C1.

When step S1 is negative, i.e. when the diff lock sensor 64 is off, step S6 is proceeded to, and it is determined whether or not the diff lock release counter C2 is "0." This determination is initially negative and step S9 is proceeded to, and "1" is subtracted from the diff lock release counter C2. If the confirmation in step S6 is affirmative, step S7 is proceeded to and a diff lock detection flag is set to "0." In step S8, the diff lock counter C is set to "0."

Figure 7:
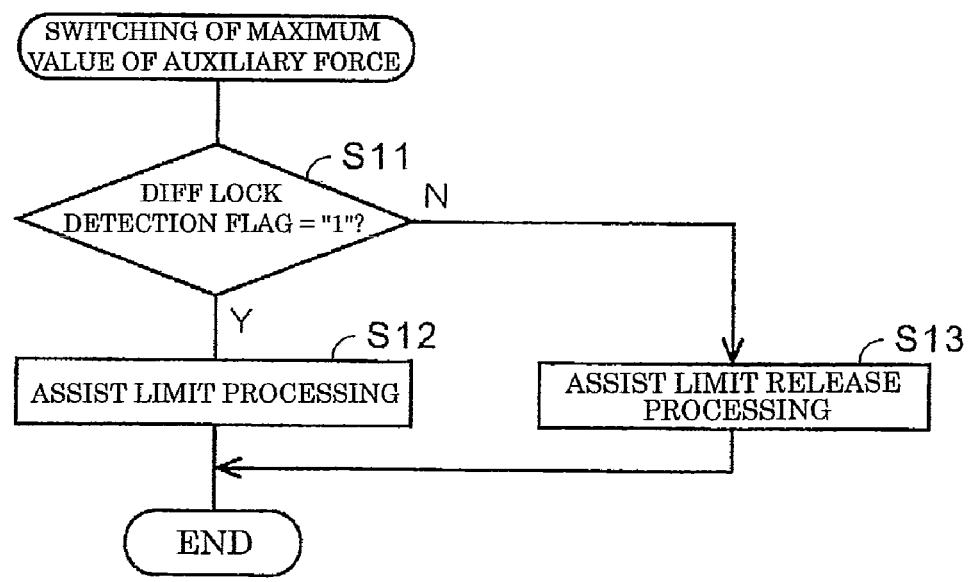
FIG. 7 is a flowchart of processing for switching an auxiliary force maximum value in EPSECU.

FIG. 7 is a flowchart of the processing for switching over the maximum value for the auxiliary force. In step S11 of FIG. 7, it is determined whether the diff lock detection flag is "1" or "0." When the diff lock detection flag is "1," step S12 is proceeded to and assist control processing to limit the maximum value of the auxiliary force to a small value is carried out. When the diff lock detection flag is "0," step S13 is proceeded to and assist limit releasing to return the auxiliary force from the limit value to the maximum value is carried out. The maximum value and the limit value for the auxiliary force can be set arbitrarily rather than being fixed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power steering device for a vehicle equipped with a steering shaft with handlebars fitted at an upper end, an electric power steering device coupled to the steering shaft that generates auxiliary force that supplements steering force, a differential device, and a diff lock unit that selects a differential state and a non-differential state of the differential device, the power steering device comprising:
   a diff lock sensor for sensing when a non-differential state of the differential device is selected by the diff lock unit; and
   a control unit for reducing a maximum value of the auxiliary force generated by the electric power steering device to a prescribed limit value when a non-differential state of the differential device is detected by the diff lock sensor.

2. The power steering device for a vehicle according to claim 1, wherein the control unit reduces the maximum value for the auxiliary force when the non-differential state of the differential device continues for a prescribed duration.

3. The power steering device for a vehicle according to claim 1, wherein the control unit releases limiting of the maximum value for the auxiliary force when it is detected from the detection output of the diff lock sensor the differential device has switched over from a non-differential state to a differential state.

4. The power steering device for a vehicle according to claim 2, wherein the control unit releases limiting of the maximum value for the auxiliary force when it is detected from the detection output of the diff lock sensor the differential device has switched over from a non-differential state to a differential state.

5. The power steering device for a vehicle according to claim 3, wherein the auxiliary force gradually makes the transition to the limit value when limiting the auxiliary force, and the auxiliary force gradually makes the transition to the maximum value when releasing limiting of the auxiliary force.

6. The power steering device for a vehicle according to claim 4, wherein the auxiliary force gradually makes the transition to the limit value when limiting the auxiliary force, and the auxiliary force gradually makes the transition to the maximum value when releasing limiting of the auxiliary force.

7. The power steering device for a vehicle according to claim 5, wherein the speed of the auxiliary force making the transition from the maximum value to the limit value is set to be faster than the speed of the auxiliary force making the transition from the limit value to the maximum value.

8. The power steering device for a vehicle according to claim 6, wherein the speed of the auxiliary force making the transition from the maximum value to the limit value is set to be faster than the speed of the auxiliary force making the transition from the limit value to the maximum value.

9. The power steering device for a vehicle according to claim 1, and further including a diff lock counter, wherein when the diff lock sensor is on the diff lock counter calculates a duration time of a detection output of the diff lock sensor.

10. The power steering device for a vehicle according to claim 9, wherein if the diff lock counter exceeds a threshold value a diff lock release counter calculates the duration time of the diff lock sensor, if the diff lock counter does not exceed a threshold value, a value is added to the diff lock counter.

11. A power steering device for a vehicle equipped with a steering shaft comprising:
   an electric power steering device coupled to the steering shaft for generating auxiliary force that supplements a steering force;
   a differential device;
   a diff lock unit that selects a differential state and a non-differential state of the differential device;
   a diff lock sensor for sensing when a non-differential state of the differential device is selected by the diff lock unit; and
   a control unit for reducing a maximum value of the auxiliary force generated by the electric power steering device to a prescribed limit value when a non-differential state of the differential device is detected by the diff lock sensor based on a steering torque, a steering angle and a speed of the vehicle.

12. The power steering device for a vehicle according to claim 11, wherein the control unit reduces the maximum value for the auxiliary force when the non-differential state of the differential device continues for a prescribed duration.

13. The power steering device for a vehicle according to claim 11, wherein the control unit releases limiting of the maximum value for the auxiliary force when it is detected from the detection output of the diff lock sensor the differential device has switched over from a non-differential state to a differential state.

14. The power steering device for a vehicle according to claim 12, wherein the control unit releases limiting of the maximum value for the auxiliary force when it is detected from the detection output of the diff lock sensor the differential device has switched over from a non-differential state to a differential state.

15. The power steering device for a vehicle according to claim 13, wherein the auxiliary force gradually makes the transition to the limit value when limiting the auxiliary force, and the auxiliary force gradually makes the transition to the maximum value when releasing limiting of the auxiliary force.

16. The power steering device for a vehicle according to claim 14, wherein the auxiliary force gradually makes the transition to the limit value when limiting the auxiliary force, and the auxiliary force gradually makes the transition to the maximum value when releasing limiting of the auxiliary force.

17. The power steering device for a vehicle according to claim 15, wherein the speed of the auxiliary force making the transition from the maximum value to the limit value is set to be faster than the speed of the auxiliary force making the transition from the limit value to the maximum value.

18. The power steering device for a vehicle according to claim 16, wherein the speed of the auxiliary force making the transition from the maximum value to the limit value is set to be faster than the speed of the auxiliary force making the transition from the limit value to the maximum value.

19. The power steering device for a vehicle according to claim 11, and further including a diff lock counter, wherein when the diff lock sensor is on the diff lock counter calculates a duration time of a detection output of the diff lock sensor.

20. The power steering device for a vehicle according to claim 19, wherein if the diff lock counter exceeds a threshold value a diff lock release counter calculates the duration time of the diff lock sensor, if the diff lock counter does not exceed a threshold value, a value is added to the diff lock counter.

* * * * *